United States Patent Office 3,361,697
Patented Jan. 2, 1968

3,361,697
PLASTICIZED POLYLACTAMS CONTAINING CYCLIC SATURATED SULFONE
William E. Garrison, Parkersburg, W. Va., and Thomas J. Hyde, Woodbury, N.J., assignors to E. I. du Pont de Nemours and Company, Wilmington, Del., a corporation of Delaware
No Drawing. Filed Mar. 24, 1965, Ser. No. 442,524
1 Claim. (Cl. 260—30.2)

ABSTRACT OF THE DISCLOSURE

Polylactams, e.g. polycaprolactam, made from lactams having 3 to 12 carbon atoms in the lactam ring containing, as plasticizer, a cyclic saturated sulfone having 3 to 12 carbon atoms, e.g. tetramethylene sulfone.

---

The present invention relates to a new process for the manufacture of plasticized articles of polylactams and the novel composition resulting therefrom.

The polymerization of lactams to polylactams, particularly caprolactam to give 6-nylon, polyamide, has been known for many years. The earliest processes for this polymerization were slow, requiring several hours, and involved the used of water or acidic reagents as polymerization catalysts. Subsequent work showed that anhydrous lactams could be polymerized above 200° C. in the presence of strongly basic materials, particularly the alkali and alkaline earth metals, their hydrides, hydroxides, alkoxides, oxides, alkyls or amides. More recently, it has been found that the base-catalyzed polymerization of lactams for example, caprolactam, can be made especially fast by the addition of certain compounds which function as cocatalysts or polymerization promoters. Particularly effective cocatalysts which are known in the art include acylating agents such as acyl halides, anhydrides and the like; isocyanates, and compounds containing tertiary nitrogen having at least two of the three substituents on the nitrogen atom consisting of carbonyl, thiocarbonyl, sulfonyl, phosphenyl, thiophosphenyl and nitroso radicals; aromatic carbonates and carbamyl derivatives of certain nitrogen heterocyclic compounds.

Polylactam articles made by any of the above techniques, or others known in the art, are too brittle and lack sufficient impact strength to be used successfully in some applications. Therefore, it belomes necessary to plasticize the polylactam. It was subsequently found that a plasticized polylactam could be obtained by a water-treatment process. The conventional means for plasticizing polylactams by water-treatment to increase elongation and thus reduce brittleness and increase impact strength is by boiling the polylactam in water or by exposing the polylactam article to air at ambient relative humidity. However, this method and the resultant product leave much to be desired. For example, these plasticizing treatments result in only the outer surface of the polylactam picking up a small quantity of water. Obviously, plasticizing more than a very thin surface of the polylactam article rapidly by this method is not practicable because of the low rate of diffusion of the water into the polylactam, thus optimum physical properties can not and have not been obtained in reasonable times. Then, too, some conventional plasticizers for nylon plastics are not suitable because, among other things, they leach out of the final product or are not compatible with lactams.

The sulfonamides (e.g., Santicizer 8) which are used as plasticizers in 66 nylon and 6-nylon polymer are not suitable for incorporation into the anionic polymerization system of lactams because the active hydrogens on the sulfonamide interfere with the polymerization by competing with the active hydrogen on the lactam for the base used in making the anionic catalyst, e.g., sodium.

Accordingly, an object of this invention is to provide a novel plasticized polylactam composition. Another object of this invention is to provide a polylactam composition having improved physical properties, particularly in relation to plasticity and impact strength. Still another object of the invention is to provide an economical process for making plasticized polylactams. These and other objects of the invention will become apparent from the following detailed description of the invention.

It has now been found that cyclic saturated sulfones are highly effective plasticizers for polylactams. These plasticizers have been found to substantially improve the impact strength of the polylactam in addition to reducing brittleness. The cyclic saturated sulfones that are useful as plasticizers have a total of from 3 to 12 carbon atoms in the compound, and preferably have from 3 to 8 carbon atoms. The cyclic saturated sulfone plasticizer has a melting point below 100° C. and a boiling point above 200° C. at atmospheric pressure. The preferred plasticizers have boiling points above 250° C. and more preferably above 350° C., for example, up to 700° C.

The following sulfones are representative examples of plasticizers that have been found to be most suitable; tetramethylene sulfone (sulfolane), 3-methyl tetramethylene sulfone, 2,4-dimethyl tetramethylene sulfone, 3,4-dimethyl tetramethylene sulfone, 2,3,4,5-tetramethyl tetramethylene sulfone, trimethylene sulfone, pentamethylene sulfone, hexamethylene sulfone, heptamethylene sulfone (thiacyclooctane-1-dioxide), octamethylene sulfone, (thiacyclononane-1-dioxide), 1,1-dioxo-2,3,4,5-tetramethylene-thiacyclopentane, and di-tert-butyltetrahydrothiophene-1-dioxide.

The cyclic sulfone plasticizers are added in amounts of from 1 to 4 parts per hundred parts of lactam and the preferred quantities are from about 2 to 4 parts per hundred.

The process used for polymerizing the lactam is not a part of this invention and any conventional process can be used such as water catalyzed polymerization or anionic polymerization. Preferably, however, an anionic polymerization process is used wherein a basic catalyst and a cocatalyst are present. Briefly, the anionic polymerization process involves heating a lactam in the presence of a lactam-base salt and preferably, but not necessarily, adding a cocatalyst to the lactam capable of promoting polymerization and adding a cyclic sulfone plasticizer to the mixture in amounts of from about 1 to 4 parts per hundred parts of lactam and polymerizing the reaction mixture. The sulfone can be added to the lactam at any time prior to polymerization. As will be described more fully hereinafter, a blowing agent may be added to the lactam if a foamed polylactam is desired.

The polymerization process of this invention is particularly effective in producing high molecular weight plasticized polyamides from lactams, preferably the lactams contain from 3 to 12 carbon atoms in the lactam ring. Such lactams include pyrrolidone, piperidone, ε and γ-caprolactam, enantholactam, caprylolactam, laurolactam and mixtures thereof. The preferred lactam to be polymerized is caprolactam. Generally, the anionic polymerization process can be carried out at temperatures above the melting point of the lactam monomer but below the melting point of the resulting polyamide. In general, this temperature range is from about 25° C. to about 215° C., depending on the particular lactam employed. The preferred temperature of polymerization is below 150° C. with lactams containing less than six carbon atoms. ε-Caprolactam is readily polymerized by the process of this invention at temperatures between 100° C. and 200°

C. with 150° C. being a convenient operating temperature.

The lactam-base salts or anionic catalyst used are prepared by the reaction of bases with a lactam. Generally, the lactam to be polymerized is used for the preparation of the anionic catalyst; but if desired; the anionic catalyst can be prepared from another lactam, preferably having from 3 to 12 carbon atoms in the ring.

The base employed to form the anionic catalyst can be, for example, an alkali metal, an alkaline earth metal, or a basic derivative of one of these metals such as hydroxide; hydride, amide, alkoxide; diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide.

The anionic catalyst or lactam-base salt is prepared by heating a lactam with a base at a temperature between about 25 and 225° C. The base can be added to the total lactam which is to be polymerized or to a portion of the lactam which is to be polymerized and this portion of the lactam containing the anionic catalyst added to more of the lactam later. Substantially no polymerization occurs during the preparation of the anionic catalyst, which is carried out between the melting point of the lactam and about 225° C. However, if the anionic catalyst is to be held for any appreciable time, it is preferably held at a temperature below about 125° C. The time required for the formation of the lactam-base salt depends upon the strength of the base employed, the proportion added and the temperature chosen and can be from a few seconds to several hours. Preferably, the lactam and base should be substantially anhydrous. Generally, the amount of base charged should be from about 0.1 to 10 mole percent based on the total lactam used in preparing the anionic catalyst and the subsequent polymerization. Proportions in the higher end of this range produce lower molecular weight polyamides and faster rates, so optimum proportions for most purposes are from about 0.2 to 5 mole percent of the strong base.

The cocatalysts are usually derived from organic and inorganic acids of particular types. Some effective cocatalysts include acylating agents and acyl compounds, for example, acyl halides, anhydrides, imides, organic isocyanates, ketenes, and substituted ureas. Specifically desirable are N-substituted imides having the structural formula

wherein A is an acyl radical such as carbonyl, thiocarbonyl, sulfonyl and phosphinyl radical, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert-amino, acylamido, N-substituted carbamyl, N-substituted carbamido, alkoxy and ether groups, A and B, or A and R, together can form a ring system through a divalent linking group, and any free valence bond of the A and B radicals can be hydrogen or R, excepting A directly linked thereto. The carbonate esters having at least one carbocyclic aromatic ring attached to the carbonate, (e.g., the polycarbonate of 4,4'-dihydroxydiphenyl-2,2-propane) disclosed in application Ser. No. 242,895, filed Dec. 7, 1962, and assigned to the assignee of the present application, is another desirable cocatalyst. Still another desirable cocatalyst is 2,2,4-trimethyl - 3 - hydroxy - 3 - pentenoic acid, β-lactone, disclosed in application Ser. No. 229,161, filed Oct. 8, 1962, and assigned to the assignee of the present application. The acyl-bis heterocyclic compounds (e.g., sebacoyl-bis pyrazole) disclosed in application Ser. No. 266,810, filed Mar. 21, 1963 and assigned to the assignee of the present application, are also desirable cocatalysts. The triazine derivatives (e.g., the caprolactam derivatives of triazines) disclosed in application Ser. No. 155,791, filed Sept. 5, 1961, and assigned to the assignee of the present application, is another desirable class of cocatalysts.

The cocatalysts can be employed in proportions varying from about 0.05 to about 5 mole percent based on the total lactam. Preferably, the proportion of the cocatalyst is less than the proportion of the anionic catalyst and usually not more than ½ of the proportion of anionic catalyst. The cocatalyst can be added to the lactam containing the anionic catalyst or dissolved in a separate portion of the lactam and the two portions of lactam mixed at about the time polymerization is desired. For optimum operation, an inert gas, such as nitrogen is bubbled through the molten lactam during the initial reaction of the base with the lactam to form the anionic catalyst in order to remove low molecular weight compounds, such as water and to prevent oxidation. Alternatively, the reaction of the lactam with the base to form the anionic catalyst can be carried out under reduced pressure, in which case low molecular weight compounds are distilled from the lactam. Blowing agents can be added to the polymerization mix during the initiation step if foamed articles are desired. The blowing agent may be chosen from either of two groups of chemicals. The first group comprises thermally unstable gases, liquids, and solids which are soluble in and compatible with the constituents of the catalyzed lactam composition at the mixing temperature, which do not interfere with the polymerization of lactam, and which subsequently are disengaged from the lactam composition in gaseous form during the polymerization. Materials in this group of blowing agents include, for example, benzene, cyclohexane, trioxane, hexane, heptane, hexene-1, n-octane, propane. These materials which are chemically inert in the reaction system and have suitable solubility and volatility may be used in amounts of from 0.5% to 15% by weight, preferably 2-10%.

Alternatively, a chemical blowing agent may be used that is soluble or dispersible in finely divided form in the lactam mixture, is compatible with it at working temperatures, and does not materially interfere with the polymerization of the lactam. The chemical blowing agent may be incorporated in one stream of the lactam composition together with cocatalyst and subsequently the composition after mixing with the stream containing anionic catalyst is foamed during polymerization; or the blowing agent may be added as a separate stream during the mixing of the two streams of lactam. Certain azo compounds such as α,α'-azobis(isobutyronitrile) and α,α'-azobis(cyclohexanecarbonitrile) are particularly effective chemical blowing agents.

Another class of blowing agents is disclosed in patent application Ser. No. 171,356, filed Feb. 6, 1962, and assigned to the assignee of the present application, are substituted allylic azides, including benzyl azides, which have the formula

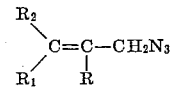

in which at least one azidomethyl group is directly attached to a carbon atom which in turn is attached to another carbon atom by a double bond which may occupy a position in either a linear or a cyclic structure. Thus, in the above formula, R, $R_1$, and $R_2$ may be hydrogen, alkyl groups, aryl groups and substituted alkyl and aryl groups; in the case of the benzyl azides the $>C=C<$ linkage will be included within an aromatic ring structure, in which case R and $R_1$ taken together in the formula above represent the carbon atoms completing the aromatic or benzenoid ring, which may also have additional substituents attached to the carbon atoms of the ring. Some representative allylic azides include, for example, 1-azido-5,5,7,7-tetramethyloctene-2, dodecenyl azide, o-methylbenzyl azides, p-methylbenzyl azide, benzyl azide, 3,4-dimethylbenzyl azide, 2,4,5-trimethylbenzyl azide, dodecylbenzyl azide, p-methylbenzyl azide, benzyl azide, 3,4-dimethylbenzene, and $\alpha^1$-azidomethyl-2,3,5,6-tetramethylbenzene.

Another class of blowing agents are the diazirines represented by the following formula

wherein $R_1$ and $R_2$ can be alkyl groups or can be combined to form a divalent radical, as, for example, in cyclohexane-3-spirodiazirine.

The polymerization reaction can be conducted in the presence of various fillers and reinforcing agents. Thus, if desired, glass mats or mats of synthetic fibers can be impregnated with the lactam solution and rapidly cured. Similarly, finely divided fillers can be suspended in the polymerizing mixture to obtain filled polyamides, for example, antioxidants, blowing agents, colorants and other resins (e.g., styrene, acrylic, nylon, polyester), can be present during polymerization. Conventional plasticizers in addition to the cyclic saturated sulfones of this invention can also be present in the final polymerized article, for example, water or monomer.

The process can also be carried out as a coating process in which the lactam solution containing anionic catalyst and cocatalyst is applyed as a liquid to the surface of a web, such as paper or a textile, and then permitted to polymerize to the polyamide and thus form a coating of polyamide film on a substrate.

For a more complete understanding of the invention the following working examples are given as illustrative, and they are not intended to be limiting. Parts and percentages when given are by weight.

EXAMPLES 1–6

Two portions of ε-caprolactam, amounting to 404 parts each, are melted. To one portion at 125° C. 1.5 mol percent of NaH (as a 50-50 mixture with white paraffin oil) and 24.2 parts of potassium stearate is added. The mix is sparged with nitrogen and heated to 150° C. To the other portion the cocatalyst and the plasticizer are added and the temperature adjusted to 150° C. while sparging with nitrogen. The two portions are mixed, the blowing agent is injected, the mix agitated with nitrogen for 15 seconds and then poured into a sheet mold at 150° C. After the proper curing time, designated in Table I and II, the latter table being a control, the mold is cooled and the sheet removed. The physical properties of the sheets are determined in the bone dry state at 73° F. and recorded in Table III. Tensile strength elongation and secant modulus are measured by ASTM method D–638–52T. Izod impact strength is measured by ASTM D–256–54T. Falling ball impact is measured by the method given in Materials and Methods Magazine, July 1954, p. 117.

Vacuum extractables are determined by heating a dry, finely ground sample of the polylactam resin for one hour at 175° C. and 0.1 to 1.0 mm. pressure and then determining the loss in weight.

$$\text{Percent Extractables} = \frac{\text{wt. loss}}{\text{sample wt.}} \times 100$$

TABLE I

| Ex. No. | Cocatalyst | Mol. Percent Cocatalyst | Blowing Agent | Blowing Agent Parts/100 of Lactam | Cure Time (min.) | Plasticizer | Parts Plasticizer/ 100 parts Lactam |
|---|---|---|---|---|---|---|---|
| 1 | Poly(diphenylolpropane carbonate) ("Lexan 105"). | 0.4 | Dodecenyl azide | 0.52 | 7 | Tetramethylene sulfone. | 2.0 |
| 2 | ----do---- | 0.4 | ----do---- | 0.52 | 7 | ----do---- | 1.0 |
| 3 | ----do---- | 0.3 | Pentamethylene diazirine | 0.25 | 10 | ----do---- | 3.5 |
| 4 | ----do---- | 0.3 | Dodecenyl azide | 0.55 | 10 | ----do---- | 3.5 |
| 5 | 1:2 adduct of hexamethylene diisocyanate and caprolactam. | 0.3 | ----do---- | 0.55 | 10 | ----do---- | 3.5 |

TABLE II (Control)

| | Cocatalyst | Mol. Percent Cocatalyst | Blowing Agent | Blowing Agent Parts/100 of Lactam | Cure Time (min.) | Plasticizer | Parts Plasticizer/ 100 parts Lactam |
|---|---|---|---|---|---|---|---|
| A | Poly(diphenylopropane carbonate) ("Lexan 105"). | 0.4 | Dodecenyl azide | 0.52 | 7 | None | 0 |
| B | ----do---- | 0.3 | Pentamethylene diazirine* (net). | 0.25 | 10 | ----do---- | 0 |
| C | ----do---- | 0.3 | Dodecenyl azide | 0.55 | 10 | ----do---- | 0 |

*Added as 1:2 solution of diazirine and partially hydrogenated terphenyl.

TABLE III

| Example No. | Density, g./cc. | Vacuum Extractable, Percent | Tensile Strength, p.s.i. | Elongation, Percent | Secant Modulus, p.s.i.×10³, at— | | Notched Izod Impact, ft./lb./in. | Rockwell Hardness | Falling Ball Impact, ft./lb. |
|---|---|---|---|---|---|---|---|---|---|
| | | | | | 0.5% Strain | 2% Strain | | | |
| 1 | 0.68 | 6.56 | 4,020 | 36.0 | 156 | | 1.17 | 81 | 6 |
| 2 | 0.70 | 5.83 | 4,460 | 25.0 | 194 | | 0.64 | 109 | 4 |
| 3 | 0.64 | 7.98 | 2,850 | 17.2 | | 79 | 0.66 | 89 | 6–8 |
| 4 | 0.63 | 9.57 | 2,680 | 31.9 | | 86 | 0.74 | 57 | 6–8 |
| 5 | 0.63 | 6.99 | 3,349 | 15.0 | | 142 | 0.50 | 92 | 4 |
| A | 0.69 | 5.21 | 4,540 | 18.4 | 210 | | 0.62 | 113 | 4 |
| B | 0.62 | 4.42 | 3,620 | 8.3 | | 132 | 0.52 | 106 | 4 |
| C | 0.64 | 6.4 | 3,075 | 18.5 | | 132 | 0.40 | 88 | 4 |

EXAMPLES 6–7

Two portions of anhydrous ε-caprolactam, amounting to 113 parts each, are melted and sparged 10 minutes with dry nitrogen. To one portion is added 1.5 mole percent NaH (as a 50-50 mixture with mineral oil). To the other portion is added 0.5 mole percent of 2,2,4-trimethyl-3-hydroxy-3-pentenoic acid β-lactone and the amount of tetramethylene sulfone indicated below. Both portions are heated to 150° C. and mixed, poured into a mold preheated to 150° C., and cured at 150° C. for 5 minutes. The polymers obtained were light tan in color and tough. Physical properties are measured in the bone dry state.

| Example No. | Wt. of TMS | Percent Elong. | Notched Izod Impact, ft./lb. | Tensile Strength (p.s.i.) | Secant Modulus 0.50% Strain × $10^3$ (p.s.i.) |
|---|---|---|---|---|---|
| Control | 0 | 12 | 0.5 | 11,950 | 486 |
| 6 | 2 | 77 | 0.57 | 9,290 | 365 |
| 7 | 4 | 52 | 0.85 | 8,770 | 321 |

The above procedure is repeated substituting 3-methyltetramethylene sulfone or 3,4-dimethyltetramethylene sulfone for tetramethylene sulfone. Similar results are obtained.

We claim:

1. In a process for the preparation of polycaprolactam which comprises heating caprolactam in the presence of a lactam-base salt and a cocatalyst, poly(diphenylolpropane carbonate), capable of promoting polymerization, the improvement which comprises conducting polymerization of the lactam in the presence of from 2 to 4 percent tetramethylene sulfone as a plasticizer.

References Cited

UNITED STATES PATENTS

| | | | |
|---|---|---|---|
| 2,482,631 | 9/1949 | Morris | 260—30.8 |
| 2,504,099 | 4/1950 | Morris | 260—30.8 |
| 2,617,777 | 11/1952 | Heisenberg | 260—30.8 |
| 2,806,829 | 9/1957 | Capps | 260—30.8 |
| 2,811,497 | 10/1957 | Ham | 260—30.8 |
| 3,006,899 | 10/1961 | Hill | 260—78 |
| 3,011,989 | 12/1961 | Russel | 260—304 |

JULIUS FROME, *Primary Examiner.*